April 30, 1929.　　　A. J. TOOL　　　1,711,366
SANITARY POULTRY FOUNTAIN
Filed June 21, 1927
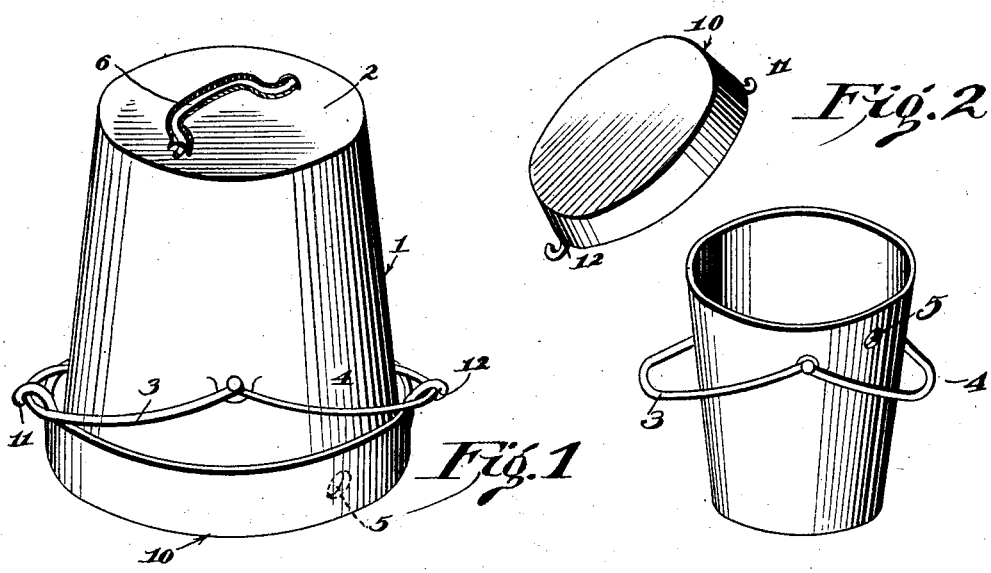
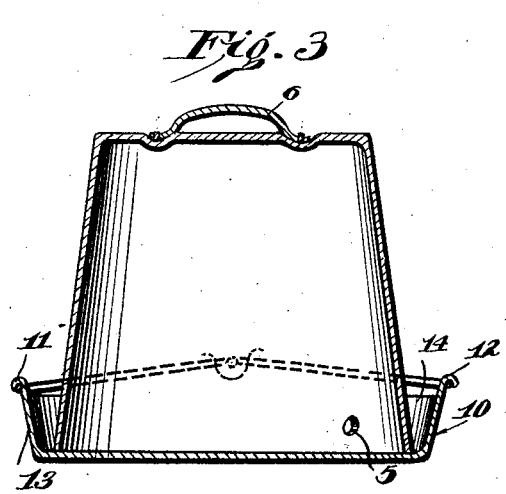
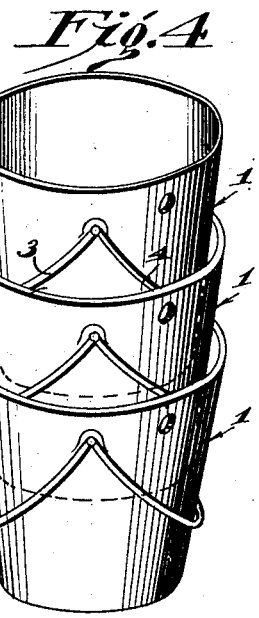
INVENTOR
A.J. Tool
BY
ATTORNEY Patented Apr. 30, 1929.

UNITED STATES PATENT OFFICE.

1,711,366

ARTHUR J. TOOL, OF MURDOCK, NEBRASKA.

SANITARY POULTRY FOUNTAIN.

Application filed June 21, 1927. Serial No. 200,382.

This invention relates to sanitary drinking fountains for poultry, and a primary object thereof is to so construct a fountain that the different parts may be nested for shipping or storage, and in which they are greatly simplified so that the cost of manufacture may be greatly reduced, and consequently, the cost to the consumer correspondingly lowered.

Another object of the invention is to so construct such a fountain that the same bail or handle used for carrying the reservoir may be and is also used for attaching the reservoir to the dispensing pan.

Another object is to so construct a fountain of this character so that the parts thereof may be readily separated for cleansing and are easily connected for use as to filling.

In carrying out these objects, the invention is susceptible of a wide range of modification without departing from the spirit or sacrificing any of the advantages of the claimed invention; there being shown in the drawings for illustrative purposes a preferred and practical form, in which;

Figure 1 represents a perspective view of a fountain constructed in accordance with this invention, shown ready for use, Fig. 2 is a group view showing the reservoir and dispensing pans separated and in position ready for assembly, Fig. 3 is a vertical section of the assembled fountain, Fig. 4 is a perspective view taken from the side, showing a plurality of the reservoirs in nested position for storage or shipment, and Fig. 5 is a similar view of the dispensing pans.

The reservoir herein shown comprises a pail or bucket shaped member 1 tapering toward its bottom 2 and having bails 3 and 4 pivotally connected at their ends to opposite sides of the bucket at points spaced from the free edge thereof, as is shown clearly in Fig. 2. These two bails 3 and 4 are designed, when opened out into the position shown in Figs. 1 and 2, to be used as connectors for uniting the reservoir with the water distributing pan or trough 10 which latter is equipped at diametrically opposite points with out-turned hooks 11 and 12 for engagement by the bails 3 and 4, as shown clearly in Fig. 1, and by means of which the two members 1 and 10 are securely held in operative position.

The reservoir 1 is provided near its free edge with a feed vent 5 spaced above the free edge of the reservoir as shown clearly in Fig. 3 and through which the water is discharged into the dispensing pan in the manner usual with fountains of this character. The dispensing pan 10 may be of any desired depth according to the size of the poultry to drink therefrom, and, of course, the depth of the water in the pan is controlled by the distance the feed vent 5 is located from the edge of the bucket or reservoir. The side wall or flange 13 of the pan 10 preferably flares slightly as shown in Fig. 3 so that in connection with the walls of the reservoir will provide an annular trough around the fountain which is substantially V-shaped in cross section, as shown at 14 and in which the water flows from the reservoir and is accessible to the poultry without any possibility of their getting into the trough and soiling the water.

A hand grip 6 is shown pivotally mounted on the bucket bottom 2 and is designed for use in lifting the fountain from place to place when the parts are connected for use, as shown in Figs. 1 and 3. This hand grip 6 is pivoted so as to fold down flat against the bucket bottom when not in use, and which is desirable when the buckets or reservoirs are to be nested as shown in Fig. 4.

It will thus be seen that this fountain is very simple in construction and that the reservoir 1 may be separated from the dispensing pan 10 and used as a bucket when found desirable to do so, and that the pans may be also used without the bucket, when for any reason such use is desirable. In filling the fountain, all that is necessary is to turn the bucket topside, or open-end up, fill it with water, place the pan thereover it, spread the bails out in opposite directions as shown in Figs. 1 and 2, and hook them under the hooks 11 and 12 of the pan and then reverse the completed container into the position shown in Figs. 1 and 3 when it will be ready for use, and will feed the water out through the vent 5 until all has been consumed. Obviously, these members are very easily cleaned, and hence the fountain is much more sanitary, than if it were more complicated.

When a number of fountains are to be shipped or stored, the reservoirs are separated from the dispensing pans and the pans are nested one within the other as shown in Fig. 5 while the reservoirs are nested as shown in Fig. 4, and will thus occupy a minimum amount of space which is very desirable for many reasons.

Without further description it is thought that the features and advantages of the invention will be readily apparent to those skilled in the art, and it will of course, be understood that changes in the form, proportion and minor details of construction may be resorted to, without departing from the spirit of the invention or its scope as claimed.

I claim:—

1. A drinking fountain for poultry and the like comprising a water reservoir, open at one end and closed at the other, a dispensing pan to be mounted over the open end of said reservoir, and bails pivotally mounted on the reservoir and opening out in opposite direction for engagement with the dispensing pan, said dispensing pan having means for cooperating with the bails to hold them engaged therewith, and a feed vent in one side wall of the reservoir.

2. A sanitary drinking fountain for poultry and the like comprising a reservoir open at one end and closed at the other, a pair of bails pivotally connected at their ends to opposite sides of said reservoir near the open end thereof and adapted to open outwardly in opposite direction, a water dispensing pan to be mounted over the open end of said reservoir and having diametrically opposite hooks for engagement by the bails of the reservoir whereby these members are connected for use.

3. A sanitary drinking fountain for poultry and the like comprising a reservoir open at one end and closed at the other, a pair of bails pivotally connected at their ends to opposite sides of said reservoir near the open end thereof and adapted to open outwardly in opposite direction, a water dispensing pan to be mounted over the open end of said reservoir and having diametrically opposite hooks for engagement by the bails of the reservoir whereby these members are connected for use, said reservoir having on the outer face of the bottom thereof a pivotally mounted handgrip foldable flat against the bottom when not in use.

ARTHUR J. TOOL.